US010138021B2

(12) United States Patent
Foster (10) Patent No.: US 10,138,021 B2
(45) Date of Patent: Nov. 27, 2018

(54) DEPLOYABLE CLIP

(71) Applicant: REPLENISH BOTTLING, LLC., Los Angeles, CA (US)

(72) Inventor: Jason E. Foster, Los Angeles, CA (US)

(73) Assignee: REPLENISH BOTTLING, LLC, Los Angeles, CA (US)

( * ) Notice: Subject to any disclaimer, the term of this patent is extended or adjusted under 35 U.S.C. 154(b) by 0 days.

(21) Appl. No.: 15/691,328

(22) Filed: Aug. 30, 2017

(65) Prior Publication Data

US 2018/0057209 A1 Mar. 1, 2018

Related U.S. Application Data

(60) Provisional application No. 62/381,236, filed on Aug. 30, 2016.

(51) Int. Cl.
*B65D 23/00* (2006.01)
*A45F 5/02* (2006.01)
*F16B 2/10* (2006.01)
*F16M 13/00* (2006.01)

(52) U.S. Cl.
CPC .......... *B65D 23/003* (2013.01); *A45F 5/02* (2013.01); *A45F 5/021* (2013.01); *A45F 5/022* (2013.01); *F16B 2/10* (2013.01); *F16M 13/005* (2013.01)

(58) Field of Classification Search
CPC .......... B65D 23/003; B05B 11/3011; B05B 11/0027; A45F 5/02; A45F 3/18; F16M 13/005; F16B 2/10
USPC .... 248/316.7, 339, 340, 230.7, 231.81, 103, 248/312, 99; 222/153.14, 174, 384, 222/402.15, 402.13; 224/242, 269, 148.7, 224/247, 251, 268, 666, 667
See application file for complete search history.

(56) References Cited

U.S. PATENT DOCUMENTS

| | | | | |
|---|---|---|---|---|
| 2,874,679 | A * | 2/1959 | Zepelovitch | B43K 5/00 24/11 F |
| 3,160,354 | A * | 12/1964 | Burkett | B01F 5/223 241/275 |
| 6,244,469 | B1 * | 6/2001 | Knickerbocker | B05B 11/3011 222/153.14 |
| 6,959,121 | B2 * | 10/2005 | Kumazawa | G06K 9/3216 382/294 |
| 7,748,583 | B1 * | 7/2010 | Woltman | A45D 20/12 224/242 |
| 7,757,906 | B2 * | 7/2010 | Barry | B65D 83/206 116/214 |
| 8,720,756 | B2 * | 5/2014 | Parsons | A45F 5/02 224/269 |
| 2004/0020950 | A1 * | 2/2004 | Overbay | A45F 3/18 224/148.7 |

(Continued)

*Primary Examiner* — Tan Le
(74) *Attorney, Agent, or Firm* — Kleinberg & Lerner, LLP; Marvin H. Kleinberg; Marshall A. Lerner (57) ABSTRACT

A spray bottle or other bottle is provided with a clip assembly that includes a shroud member with a collar to mount on the bottle. The shroud rests in a depression in the bottle so as not to protrude. The assembly includes a deployable clip mounted to the shroud which, when deployed enables the bottle to be suspended on a belt, waistband, pocket or even a pail or bucket. The arm has, on an inner surface, protuberances which assist in holding the assembly in place. Bias means can be provided to urge the rm into its nondeployed rest orientation.

6 Claims, 9 Drawing Sheets

(56) References Cited

U.S. PATENT DOCUMENTS

| | | | |
|---|---|---|---|
| 2007/0079762 A1* | 4/2007 | Stephanos | A01K 7/00 |
| | | | 119/74 |
| 2010/0108857 A1* | 5/2010 | Andrae | B05B 15/62 |
| | | | 248/692 |
| 2013/0105523 A1* | 5/2013 | Gill | B05B 11/0027 |
| | | | 222/384 |

* cited by examiner

DEPLOYABLE CLIP

BACKGROUND OF THE INVENTION

1. Field of the Invention

The present invention relates to fluid dispensing containers and accessories therefor that allow suspension of the container from clothing, belts or buckets, among other things. More particularly, the invention relates to a suspension system that is normally flush with the container but which can be deployed for securely suspending the container from a desired place of attachment.

2. General Background and State of the Art

Fluid dispensers, such as trigger spray bottles are in widespread use, especially when used for applying cleaning fluids to surfaces. Once the fluid has been deposited on a surface, a cleaning or wiping operation is necessary to complete the task. These tasks can be accomplished while holding the bottle. However, there are usually other tasks to be performed which do not require the bottle but which are difficult or impossible if one is holding the bottle. Similarly, hair care establishments also utilize spray bottles to apply water, conditioners, or other products Once the hair has been sprayed, it us usually necessary for the operator to use both hands while servicing the patron.

Several solutions for this problem have been disclosed in the prior art. In the patent to Bensussan et al, U.S. Pat. No. 6,540,119 B1, an assembly was provided for use with spray bottles It included a bracket which could be secured to a user that held the bottle while an extension conduit transported fluid from the bottle to the spray head which was hand held. A resiliently biased belt clip held the apparatus to the users belt.

A similar spray applicator belt hook was taught in the U.S. Patent to Vernon-Woods, U.S. Pat. No. 7,047,601 B1. The device was described as a double U-shaped piece of plastic. One arm of the deeper U slips over the belt of the user while the shallower, U can support the spray nozzle of the bottle.

In the published application of Conway et al, Publication Number US 2014/0346293 A1, there is shown a clip mounted to the bottle neck. The clip is described as "having an inverted J-shaped section which is adapted to fit onto a bucket wall, clothing or any other thin planar material.

A similar structure is shown by Andrae in Publication Number US 2010/0108857 A1. This is also a neck mounted arm which can be inserted between a belt and clothing or an element of a thin walled accessory, such as a pail or bucket. The patent to Peacock, U.S. Pat. No. 3,160,304 also showed a neck mounted arm The structures taught in the prior art extended from the bottle and were clearly an added on accessory. While some included an arm with an inherent bias toward a gripping closure, it was a result of the composition of the arm and its initial fabrication. What is needed and is provided by the present invention, is a holding arm or clip that is normally stowed in a flush location but can be deployed to engage clothing or some other planar segment.

INVENTION SUMMARY

According to the present invention, a spray bottle is provided with a recess into which is fitted a clip assembly. The clip assembly can be mounted on the neck of the bottle and fits flush into the recess. The clip assembly includes a clip arm that is rotatably mounted on an axle and biased into a resting orientation, flush with the bottle. The axle is mounted on a fixed portion which can include a gripping surface that cooperates with the inner surface of the clip arm. By depressing the upper end of the arm above the axle, the arm rotates against a bias, which can be supplied by a spring, and deploys outward for engagement with either clothing, a belt or a thin walled object such as a bucket or pail, gripping between the rotating arm and the fixed portion.

When the upper end is released, a spring, if included, can bias the arm into tight engagement with the object to which it is to be fastened. Depressing the upper end again opens the clip for easy removal and the clip arm can be returned to its resting configuration adjacent the fixed portion, flush with the bottle. In alternative embodiments tabs can be placed on the clip ends to engage with recesses in the bottle or the clip assembly, assuring that the clip arm is not inadvertently deployed.

Depending upon the shape of the bottle, the recess can be placed in a location relative to the spray nozzle so that the rest position can be aligned with the sprayer facing forward or backward or with the sprayer facing toward or away from the supporting structure. The bottle design determines how the sprayer should be stored.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 2, INCLUDING FIGS. 2A AND 2B IS A PERSPECTIVE AND SIDE VIEW, RESPECTIVELY, OF DEPLOYABLE CLIP ASSEMBLY OF THE PRESENT INVENTION;

FIG. 3, including

FIG. 4, including

FIG. 9, including

DETAILED DESCRIPTION OF THE PREFERRED EMBODIMENTS

Figure 1:
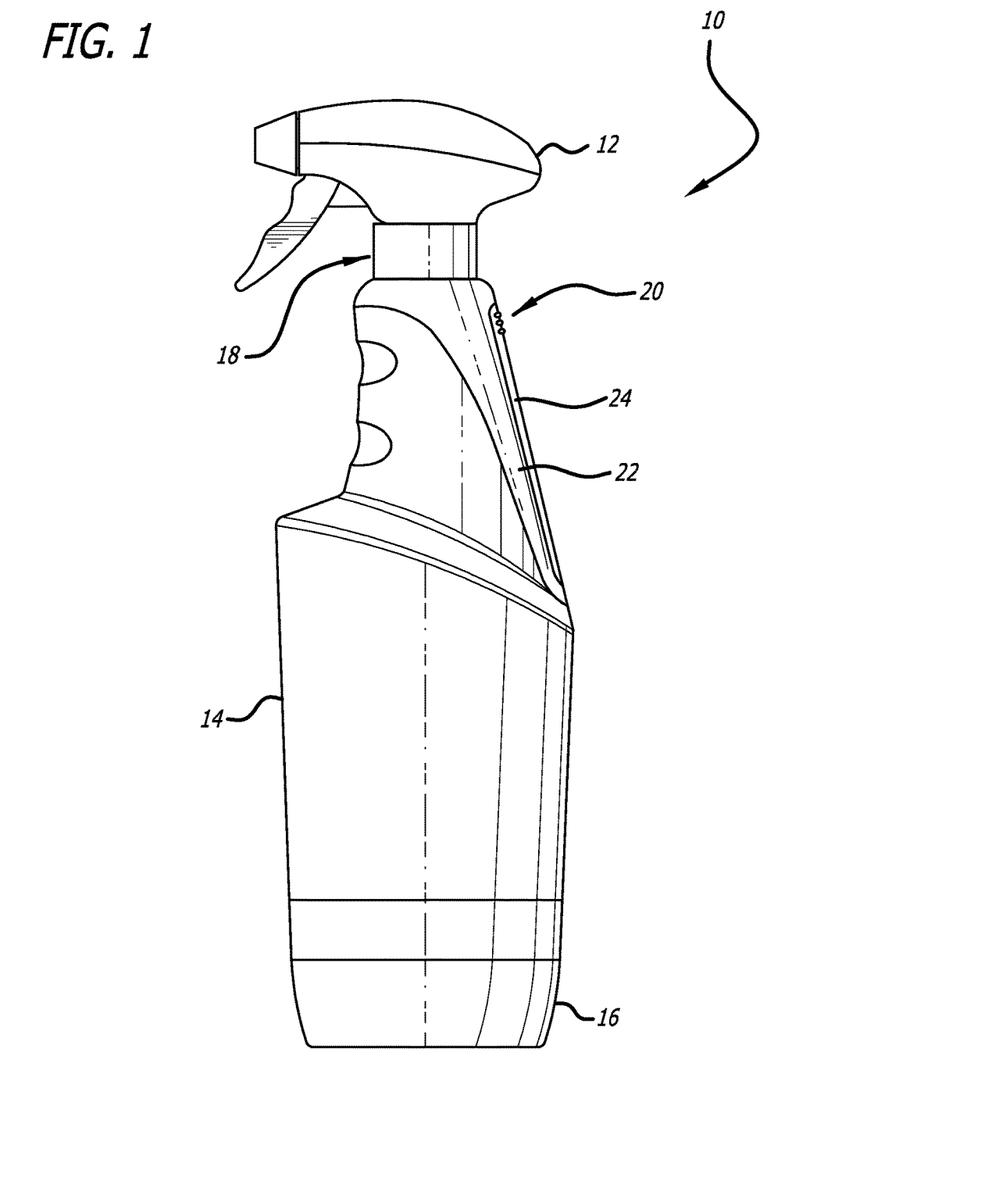
FIG. 1 is perspective view of a bottle upon which is mounted the present invention.

Turning first to FIG. 1, there is shown a bottle 10 including a spray head 12, a body 14 and, in this embodiment, a pod 16 containing a concentrate which is ultimately diluted in the body 14. Mounted on the neck 18 of the body 14 is a clip assembly 20. The clip assembly 20 includes a shroud 22 and a clip arm 24, best seen in FIGS. 2, 3 and 4. A recess in the body 14, (not seen) accommodates the clip assembly 20 so that it is flush with the body 14.

Figure 2A:
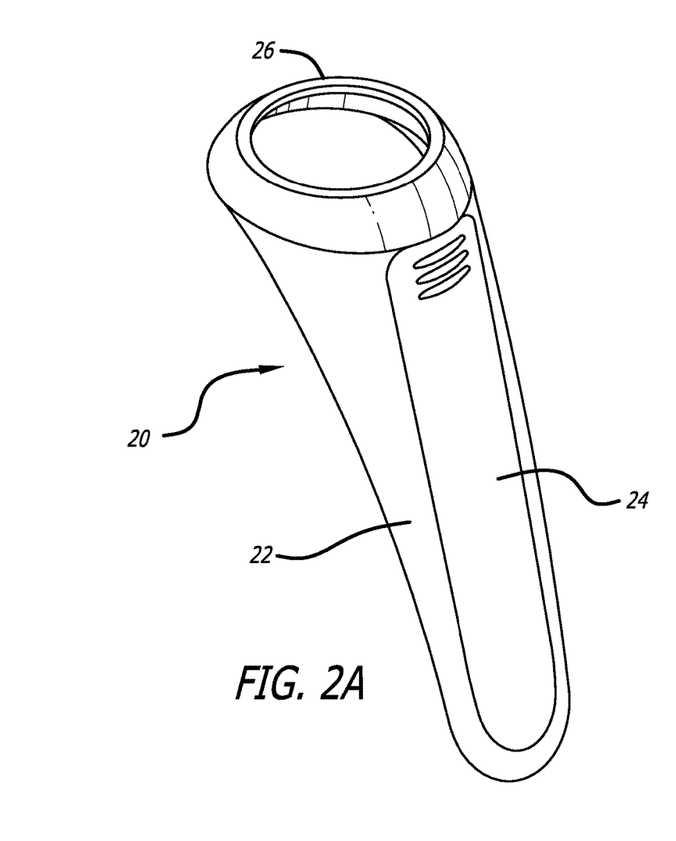
Figure 2B:
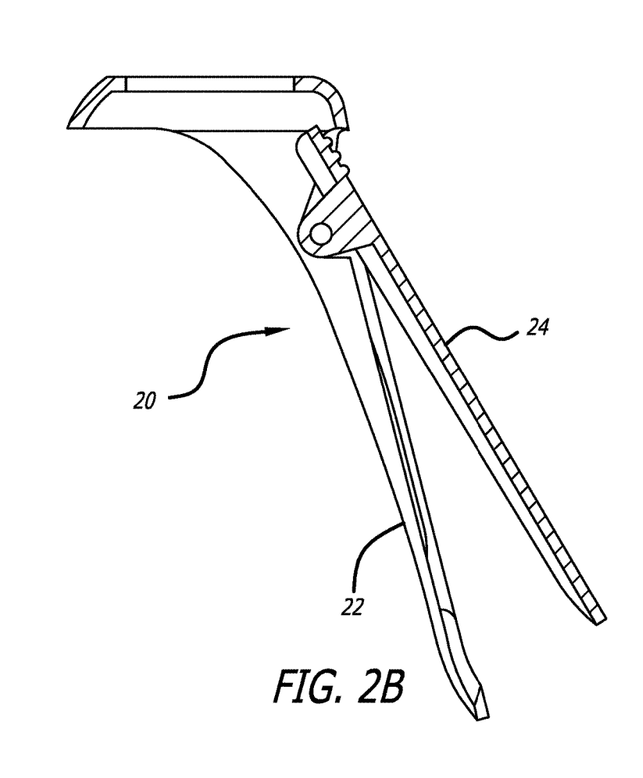
Figure 3A:
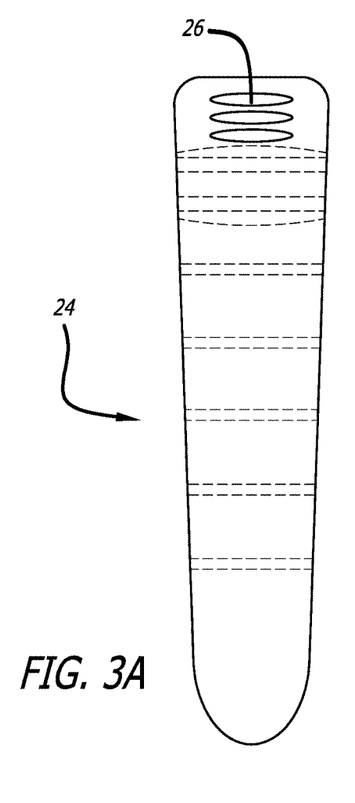
FIGS. 3A and 3B is a front and side view, respectively, of the clip element.
Figure 3B:
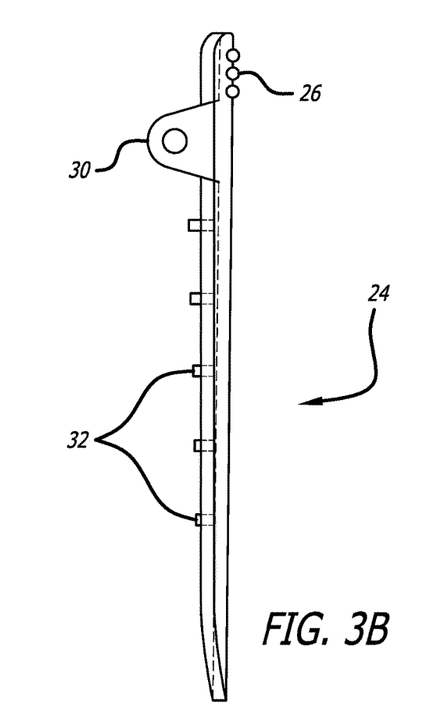

FIG. 2 shows the clip assembly 20 in greater detail. A collar 26 is adapted to fit over the neck 18 of the bottle body 14 and is an integral part of the shroud 22. The clip arm 24 is shown deployed in FIG. 2B, In FIG. 3A, the outer surface of the clip arm 24 is shown in greater detail. Rib elements 26 are added to the outer surface at the top to provide a tactile indication the appropriate place to provide pressure to deploy the clip arm 24. The side view of FIG. 2B shows the trunnions 30 which mount the clip arm 24 to the shroud 22. A pin (not shown) connects the two and allows the clip arm 24 to rotate, A plurality of protuberances 32 on the inner surface of the clip arm 24 help grip a supporting surface when the clip arm 24 is deployed and is used to support the bottle 10 on a pocket or a belt or even a bucket. If the clip arm 24 is made of a resilient material, the protuberances 32 will have a greater frictional contact with the supporting surface.

Figure 4A:
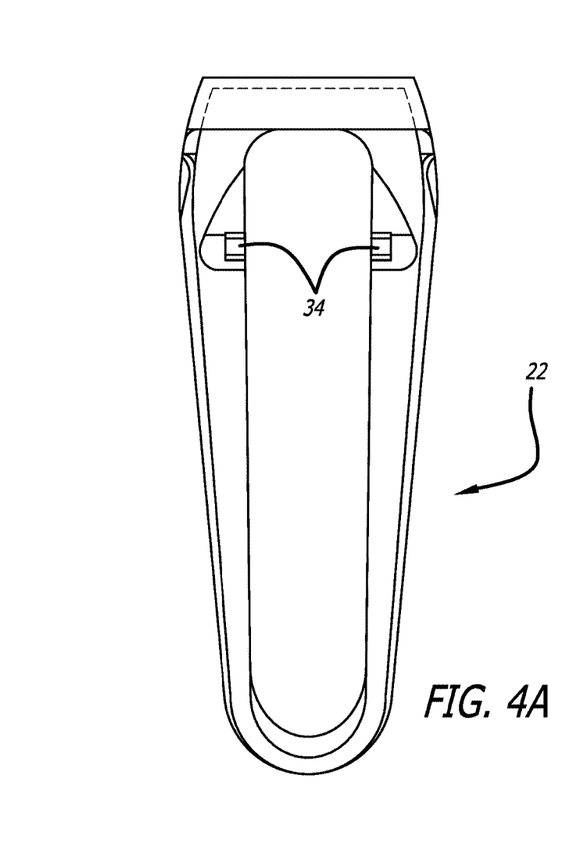
FIGS. 4A and 4B is front and side view, respectively, of the shroud portion of the deployable clip assembly of the present invention, FIG. 5, including
Figure 4B:
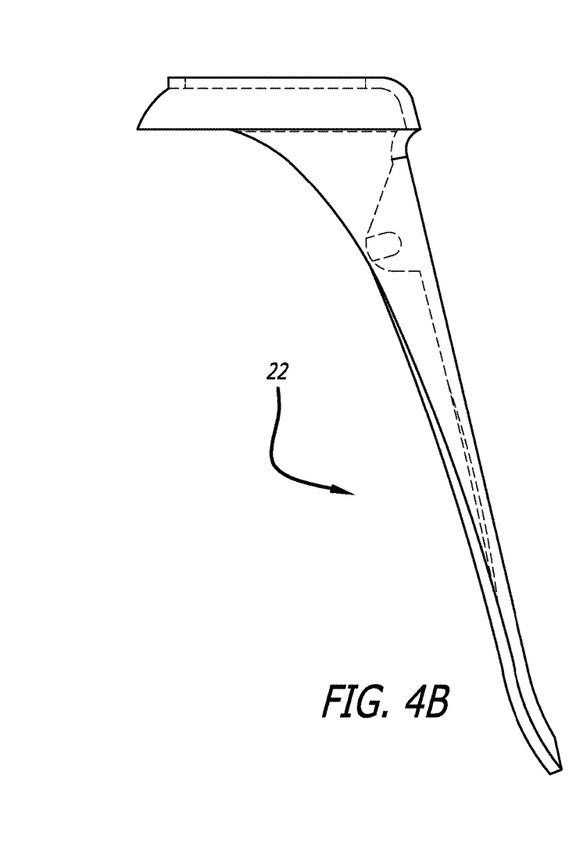

In FIG. 4A, 4B we have a rear and side view, respectively of the shroud 22. As can be seen from FIG. 4A, there are recesses 34 to receive the trunnion 30 of the clip arm 24. The shroud 22 acts as a frame for the clip arm 24 into which the clip arm 24 can rest when not in use. The trunnion 30 fits into the recesses 34 and the clip arm 24 is then free to rotate outward when the rib elements 28 are depressed.

Figure 5A:
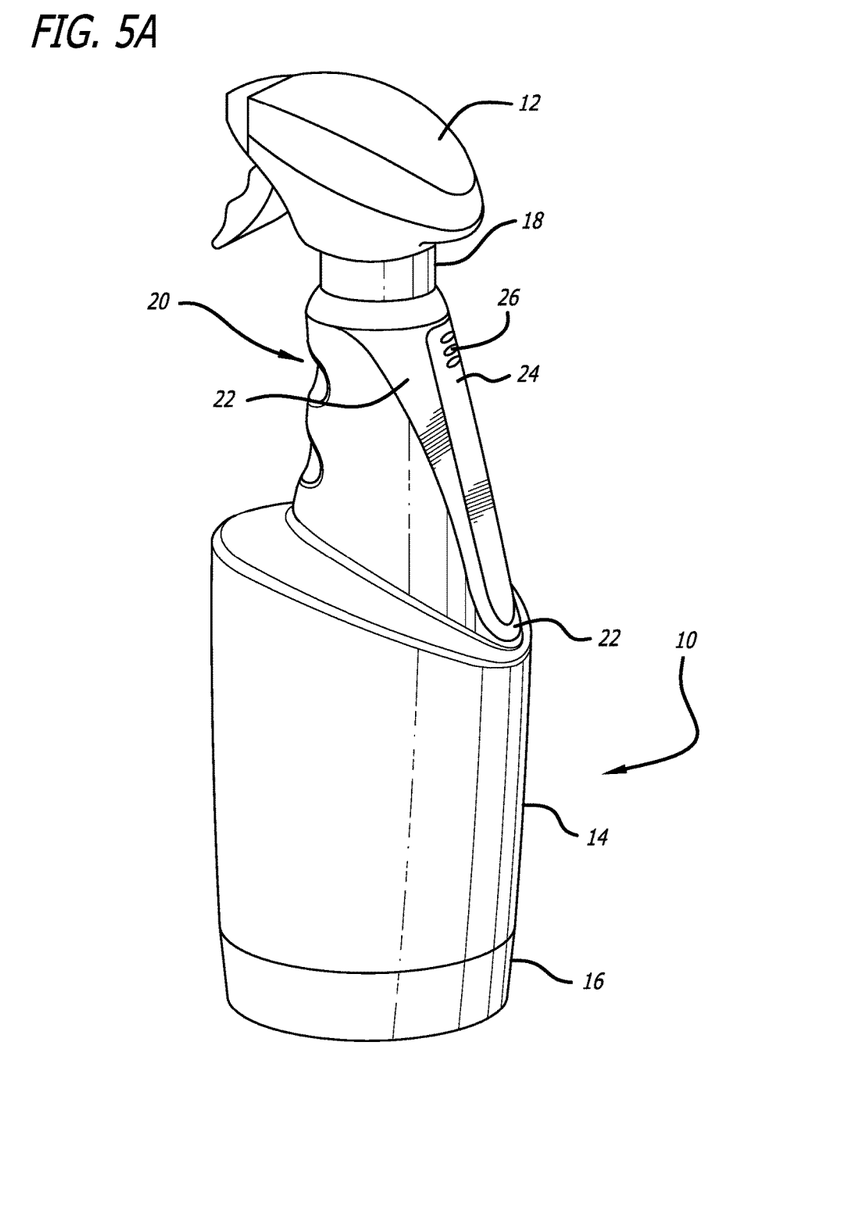
FIGS. 5A and 5B are perspective views of a bottle with the clip in place and deployed, respectively.
Figure 5B:
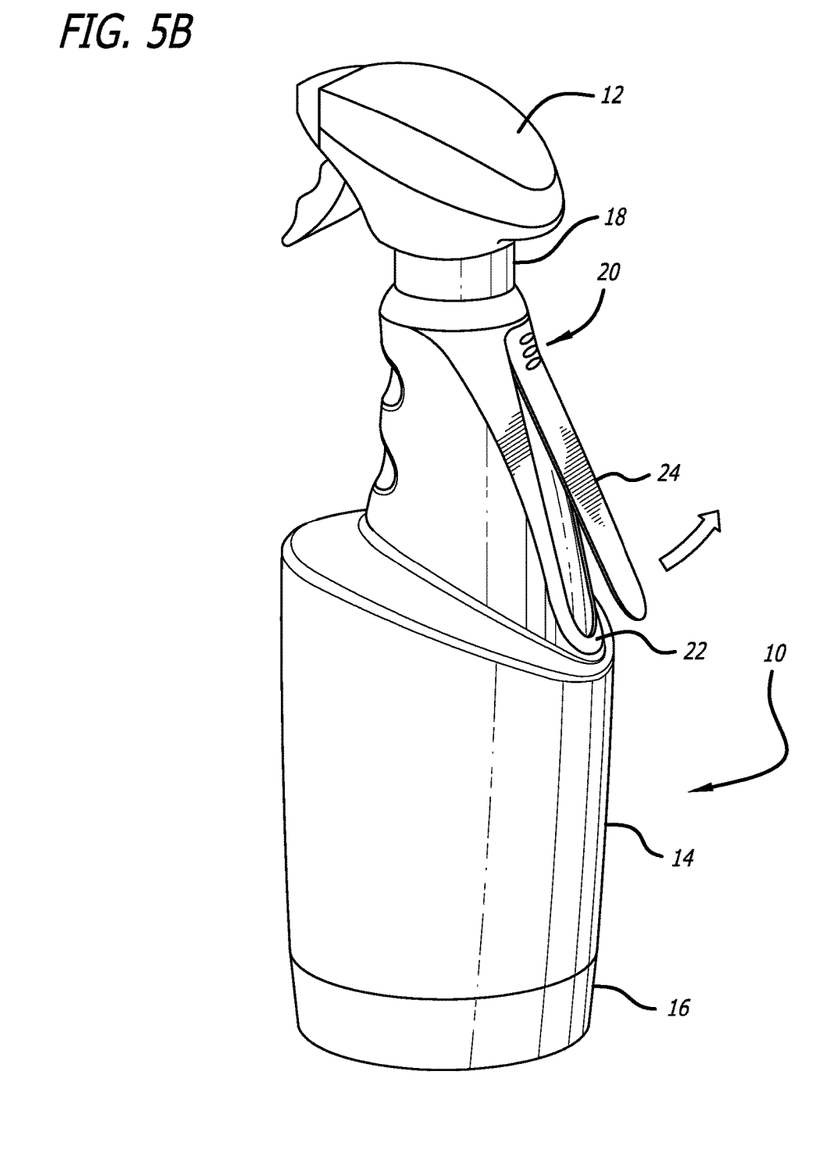
Figure 6:
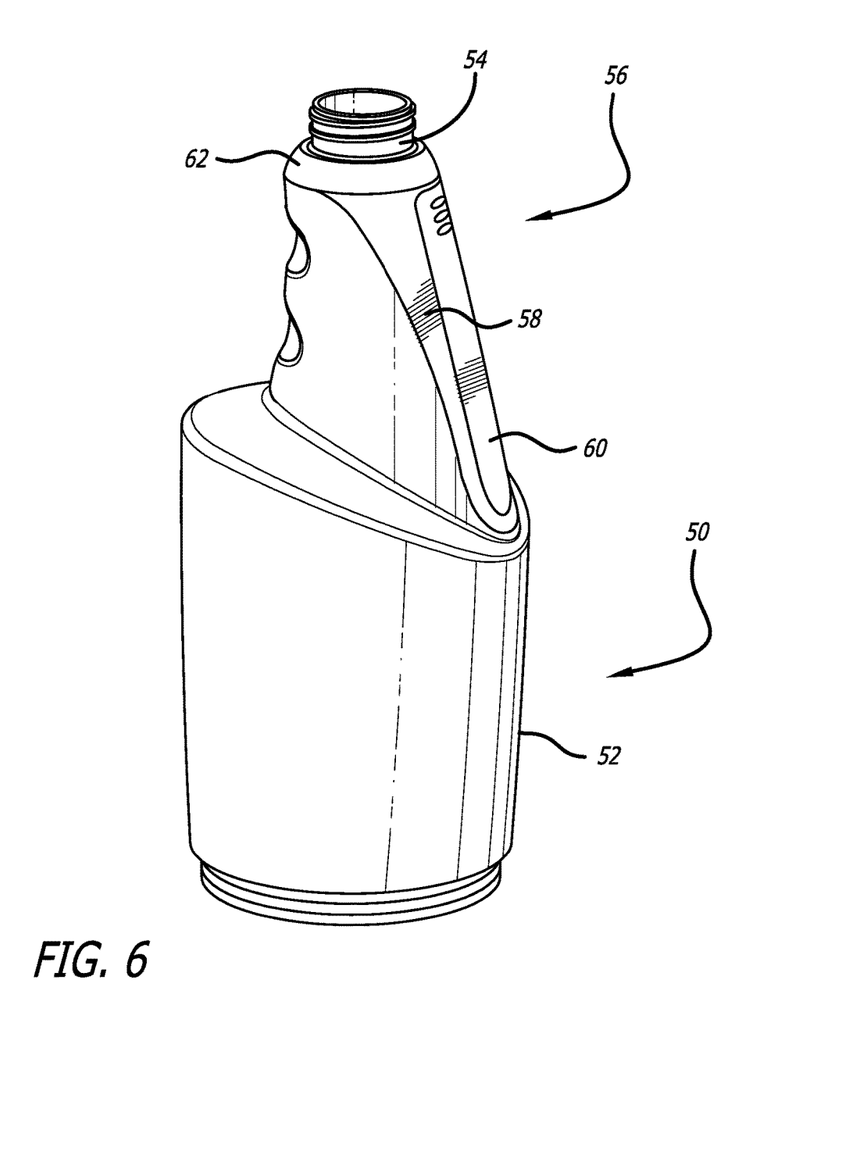
FIG. 6 is a perspective view of an alternative bottle with an attached clip assembly.

Turning finally to FIG. 5, there can be seen a spray bottle 10 fitted with the clip assembly 20 of the present invention. In FIG. 5A, the clip arm 24 is flush with the shroud 22 and is in the nesting configuration where nothing protrudes. If FIG. 5B, the clip arm 24 is deployed outward and is ready to be inserted into clothing or supported on a planar sheet such as a bucket or pail.

With the clip assembly 20 installed on a spray bottle 10, a user of the bottle can spray an object and then suspend the bottle 10 from either a clothing pocket, between a belt and clothing or from a pail or bucket. This enables the user to apply fluids and then use both hands to complete the task at hand.

In the alternative embodiment, shown in FIGS. 6-9, a bottle 50 is shown without a spray head. The body 52 includes a neck portion 54 about which is located a clip assembly 56 that rests in a recess of the body 52. The clip assembly 56 includes a shroud 58, a clip arm 60 and a collar 62, all shown in greater detail in the figures that follow.

Figure 7:
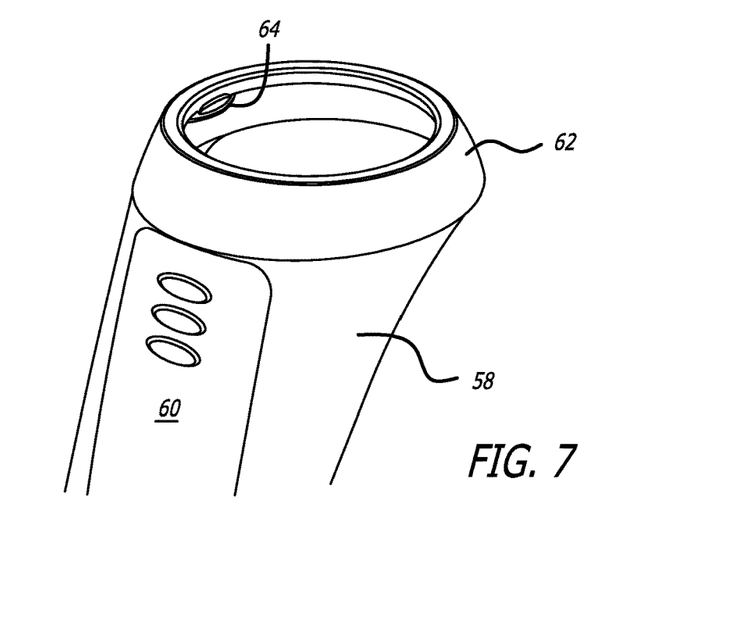
FIG. 7 is a partial perspective view of the interior of the mouth of the bottle of FIG. 6.

In FIG. 7, the interior of the collar 62 can be seen in greater detail. Slightly protruding lugs 64 are provided to engage complementary notches in the exterior surface of the bottle neck portion 54. When the lugs 64 engage the notches, the orientation of the clip assembly 56 is established and, in this embodiment, the orientation cannot be easily disturbed Also, rough handling of the bottle 50 will not easily disengage the clip assembly 56.

Figure 8:
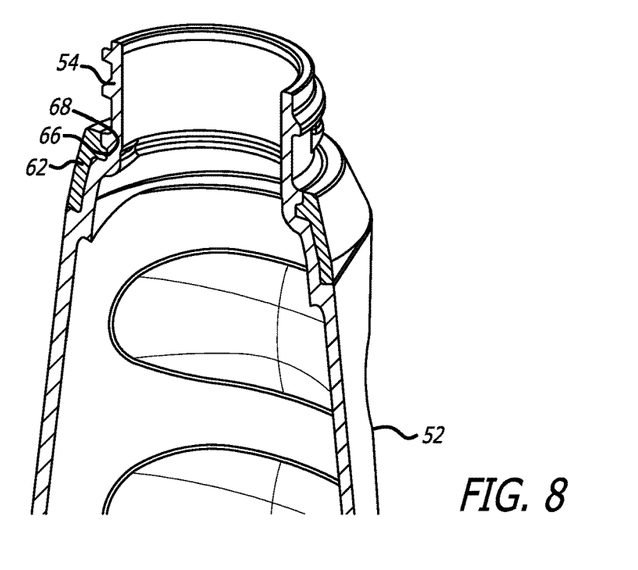
FIG. 8 is a sectional perspective view of the bottle of FIG. 6, showing the engagement of the clip assembly.

In the cutaway view of FIG. 8, the mounting of the collar 62 to the neck 54 can be seen in detail. A peripheral ring 66 on the interior surface of the collar 62 rides in a circular groove 68 on the exterior surface of the neck 54. This makes for a snap fit of the collar 62 to the neck 54 of the bottle 50.

Figure 9A:
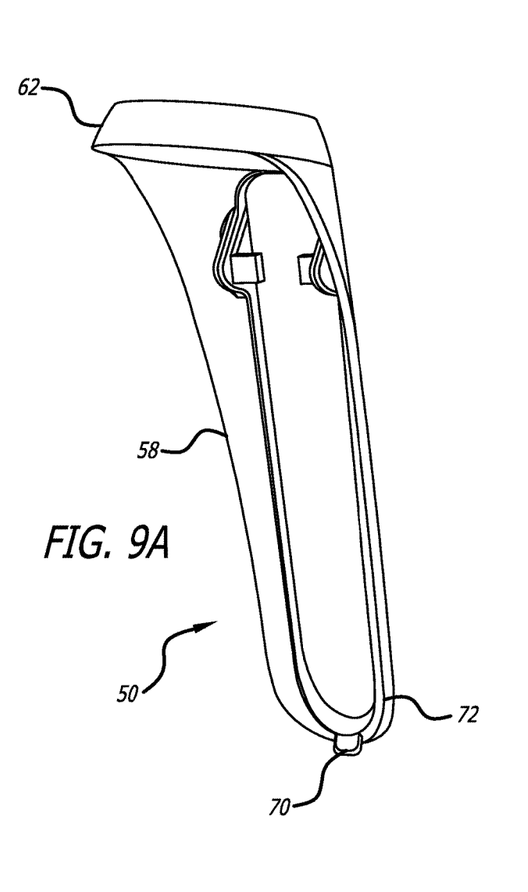
FIGS. 9A and 9B are perspective views of the elements of the alternative clip assembly of FIG. 6.
Figure 9B:
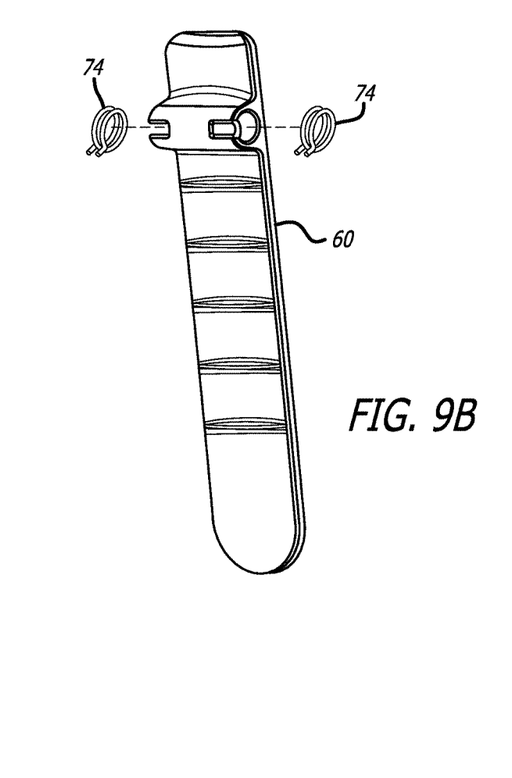

The clip assembly 56 is shown in greater detail in FIG. 9. In this embodiment, the shroud 58 has an anchoring lug 70 at its lower end 72 which mates with a complementary notch (not shown) in the body 52 of the bottle 50. This combination further assures that the clip assembly 56 cannot easily be displaced.

In this embodiment, a spring 74 is fitted between the shroud 58 and the arm 60, biasing the arm 60 into the rest configuration. That way, when the arm 60 is deployed, there is a bias urging it back, thereby assuring a better grip on the surfaces to which it is to be mounted While the specification describes particular embodiments of the present invention, those of ordinary skill can devise variations of the present invention without departing from the inventive concept.

The invention claimed is:

1. A deployable clip assembly for use with a container of liquids having a dispensing nozzle assembly attached thereto comprising:
   a. a shroud element adapted to mount on a container of liquids, said shroud element having an elongated depression; and
   b. a movable clip arm pivotally attached to said shroud element and positioned to fit into said depression in a first orientation and, in a second orientation, rotated away from said depression as a clip for supporting the container of liquids to which the assembly is mounted, wherein said clip arm has an inner surface, said inner surface of said clip arm adjacent said shroud element including a plurality of protuberances for engaging a supporting surface.

2. The clip assembly of claim 1, further including a collar for mounting said shroud element to the container of liquids.

3. The clip assembly of claim 1, further including biasing means for urging said clip arm into its first configuration.

4. A deployable clip assembly for use with a container of liquids having a dispensing nozzle assembly attached thereto comprising:
   a. a shroud element adapted to mount on a container of liquids, said shroud element having an elongated depression; and
   b. a movable clip arm pivotally attached to said shroud element and positioned to fit into said depression in a first orientation and, in a second orientation, rotated away from said depression as a clip for supporting the container of liquids to which the assembly is mounted, wherein said clip arm has an inner surface, said inner surface of said clip arm adjacent said shroud element including a plurality of protuberances for engaging a supporting surface.

5. The clip assembly of claim 4, further including a collar for mounting said shroud element to the container of liquids.

6. The clip assembly of claim 4, further including biasing means for urging said clip arm into its first configuration.

* * * * *